(No Model.)
J. H. TRAYLOR.
PLATE LIFTER.
No. 475,363. Patented May 24, 1892.
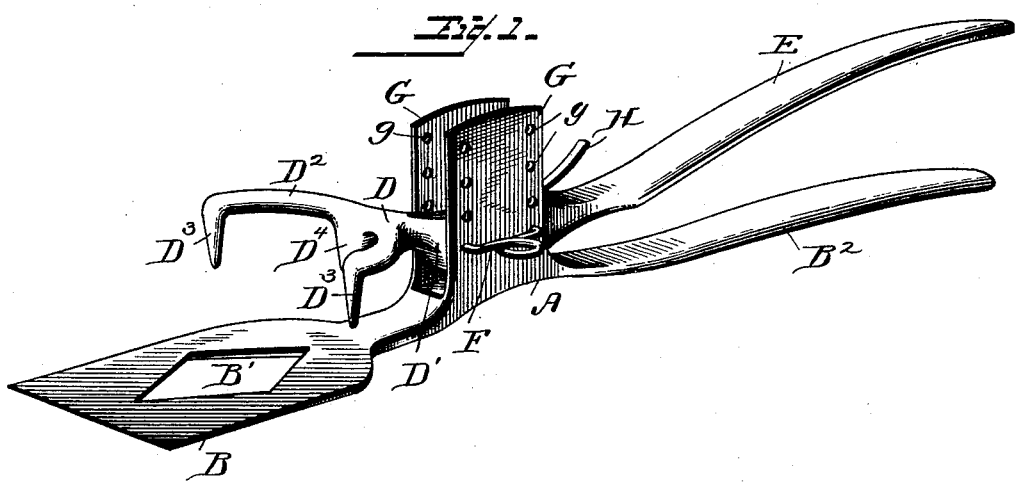
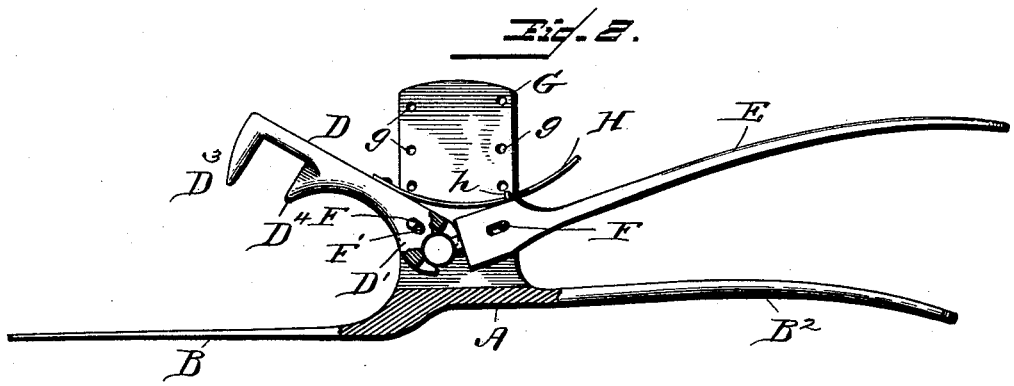
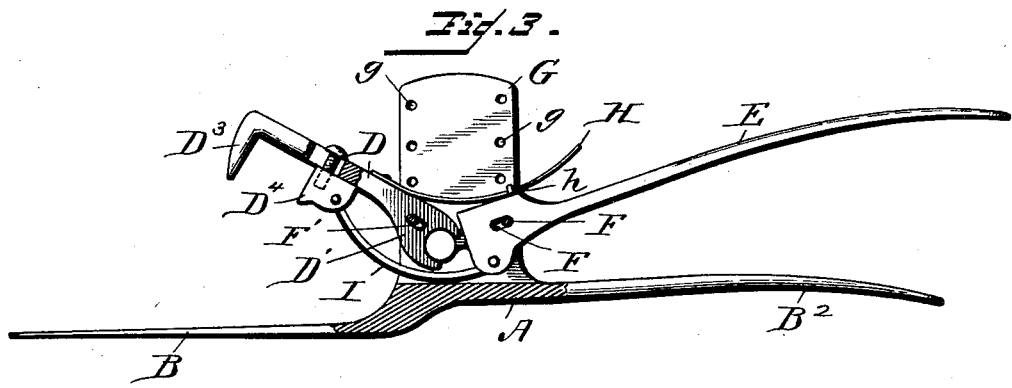
Witnesses
Inventor
John H. Traylor
By his Attorney
Franklin H. Hough

UNITED STATES PATENT OFFICE.

JOHN H. TRAYLOR, OF RICHMOND, VIRGINIA.

PLATE-LIFTER.

SPECIFICATION forming part of Letters Patent No. 475,363, dated May 24, 1892.

Application filed March 22, 1892. Serial No. 425,949. (No model.)

*To all whom it may concern:*

Be it known that I, JOHN H. TRAYLOR, a citizen of the United States, residing at Richmond, in the county of Henrico and State of Virginia, have invented certain new and useful Improvements in Plate-Lifters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in culinary tools; and it has for its object to provide a simple and convenient tool for use in turning cakes and also for lifting hot pans and other dishes, the several parts of the device being adjustable so as to permit the same to be readily adapted for use in moving dishes of different sizes.

To these ends and to such others as the invention may pertain the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, and in which drawings—

Figure 1 is a perspective view of a culinary tool embodying my improvements. Fig. 2 is a side view of the same with parts broken away. Fig. 3 is a similar view of a modification.

Reference now being had to the details of the drawings by letter, A represents the main or fixed lever of the device, which at one of its ends is provided with a flattened portion B, which serves as a cake lifter or turner, and also serves to support the bottom of the pan or other dish which is being lifted by the tool, as will hereinafter appear. An aperture B' is provided in the portion B, by means of which the tool may be hung either upon a nail or upon a handle or other projection upon the stove when the tool is not in use. The end of the lever A opposite to that which is provided with the portion B is extended to form the lower lever or handle $B^2$ of the device.

Rising from the outer edges of the fixed lever A at a point adjacent to and slightly to the rear of the portion B are the uprights or walls G G, along the outer edges of which are provided at intervals openings $g$ $g$.

The part D of the device which serves to grasp the upper edge of the pan or dish which is to be lifted consists of the body portion D', the outwardly-curved arms $D^2$ having at their extreme outer ends downwardly-extended lugs $D^3$, and of the lug $D^4$, which extends downwardly from the body portion of the casting at the point at which the arms $D^2$ unite therewith. This part D is at its rear end pivotally connected with the forward end of the operating lever or handle E, and is pivoted between the upright walls G by means of a bent wire, one end of which wire is passed through opposite openings $g$ at the front edges of the walls G and through the elongated openings F' in the base portion of the casting, while the opposite end of the wire serves in a like manner to pivot the forward end of the lever E. A flat spring H, having one of its ends attached to the upper face of the casting D and its opposite end passed loosely through a loop or keeper $h$, serves to normally hold the parts in an open position in readiness for grasping a pan or dish, as will be readily understood.

The operation of the device is simple and will from the foregoing description of construction be readily understood.

It will be seen that in order to adapt the tool for use with dishes of different sizes it is simply necessary to withdraw the wire F and raise the lever E and part D and insert the ends of the wire through openings in the walls G upon a higher plane.

In Fig. 3 of the drawings I have shown a modification of the tool, the said modification consisting simply in making the lug $D^4$ in a separate piece and adjustably connecting it to the lower face of the portion D. A curved arm or rod I, connecting the said lug $D^4$ with the end of the lever E at a point below the pivotal point of said lever, serves to force the lug forward against the edge of the pan or dish grasped by the tool when the said lever is depressed.

Having thus described my invention, what I claim to be new, and desire to secure by Letters Patent, is—

1. In a device for lifting heated plates and other articles, in combination, a fixed lever having one of its ends flattened as described and its opposite ends forming one of the handles of the tool, the walls or uprights G, rising from the outer edges of the said lever A and provided with a series of holes $g$, the lever D, having arms $D^2$, provided with downwardly-extending lugs and the lug $D^4$ at the point at which the arms are united, and the lever E, pivotally connected at its end with the inner end of the lever D and its opposite end serving as an operating-handle, said levers D and E being pivoted between the walls or uprights G upon pivots passed through holes in said uprights, adjustment being effected by changing the pivots from one set of holes $g$ to another, substantially as described.

2. The combination, with the fixed lever provided with flattened portion B and uprights G, apertured as described, of the levers D and E, each pivoted between the uprights G and pivotally connected at their ends, the depending lugs $D^3$ and $D^4$ upon the lever D, and the spring H, having one of its ends attached to one of said levers and its opposite end passed loosely through a loop or keeper upon the other lever, substantially as described, and for the purpose specified.

In testimony whereof I affix my signature in presence of two witnesses.

JOHN H. TRAYLOR.

Witnesses:
PHILIP V. SCHIRER,
JOHN A. UMLAUF.